2 Sheets--Sheet 1.

R. W. JOHNSTON & W. WHITELAW.
Improvement in Ice-Machines.

No. 126,305. Patented April 30, 1872.

Witnesses:
Chas. Nidd.
Wm H. C. Smith

Inventors:
R. W. Johnston.
W. Whitelaw.
Per Mmmfle
Attorneys.

2 Sheets--Sheet 2.

R. W. JOHNSTON & W. WHITELAW.
Improvement in Ice-Machines.

No. 126,305. Patented April 30, 1872.

Witnesses:
Chas. Nida
Wm. H. C. Smith

Inventors:
R. W. Johnston
W. Whitelaw
Per
Attorneys.

126,305

UNITED STATES PATENT OFFICE.

WILLIAM R. JOHNSTON, OF SEDALIA, MISSOURI, AND WILLIAM WHITELAW, OF MEMPHIS, ASSIGNORS TO THEMSELVES AND JOHN JOHNSON, OF MEMPHIS, TENNESSEE.

IMPROVEMENT IN ICE-MACHINES.

Specification forming part of Letters Patent No. 126,305, dated April 30, 1872.

*To all whom it may concern:*

Be it known that we, WILLIAM R. JOHNSTON, of Sedalia, in the county of Pettis and State of Missouri, and WILLIAM WHITELAW, of Memphis, in the county of Shelby and State of Tennessee, have invented a new and useful Improvement in Ice-Making; and we do hereby declare that the following is a full, clear, and exact description of the same, reference being had to the accompanying drawing forming a part of this specification.

Our invention relates to the art of making ice by artificial means; and consists in the improvements thereon, which are hereinafter fully set forth and subsequently pointed out in the claims.

We will now describe an ice-machine in which our improvements may be practically illustrated and carried out.

Figure 1:
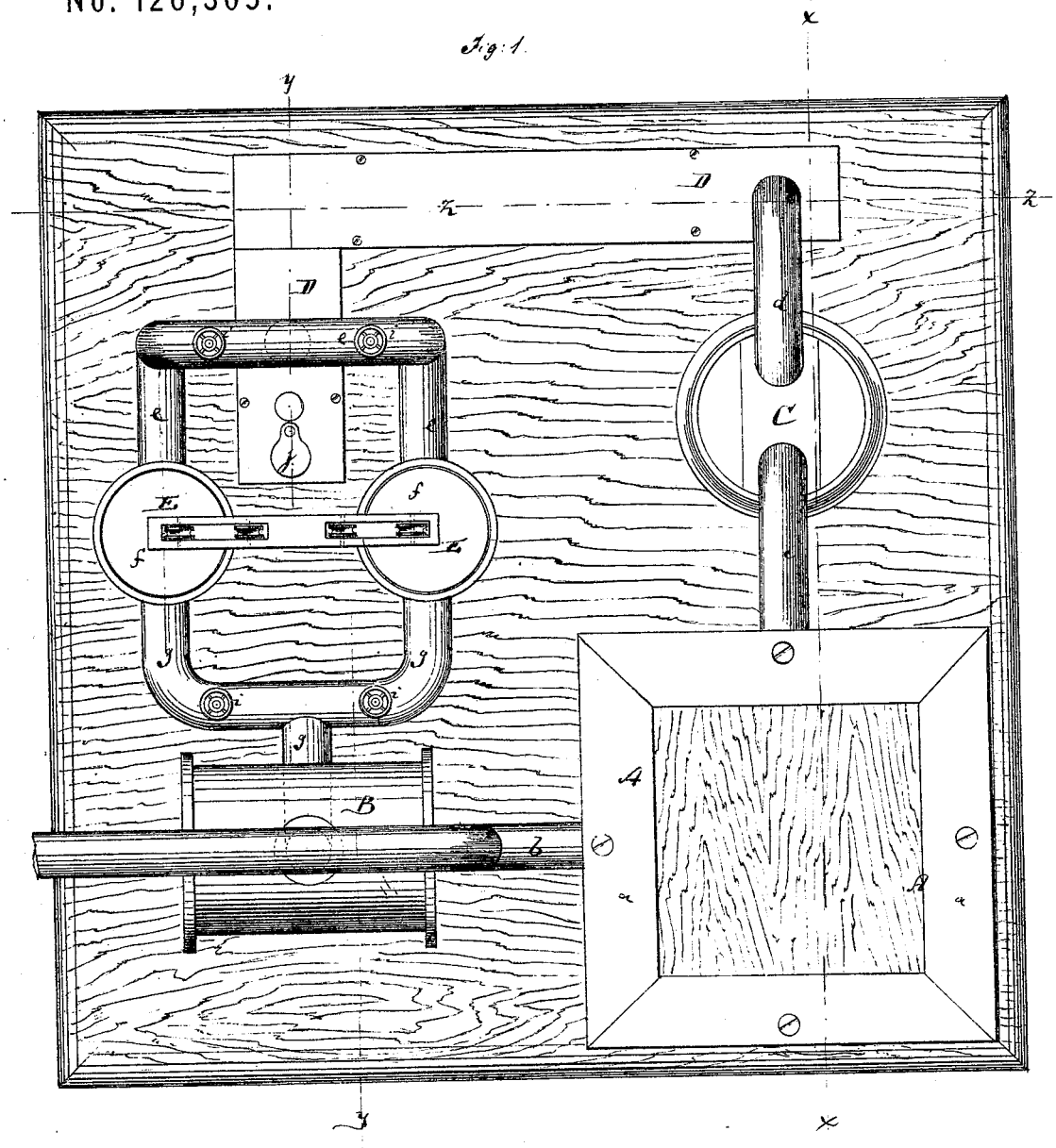
Figure 2:
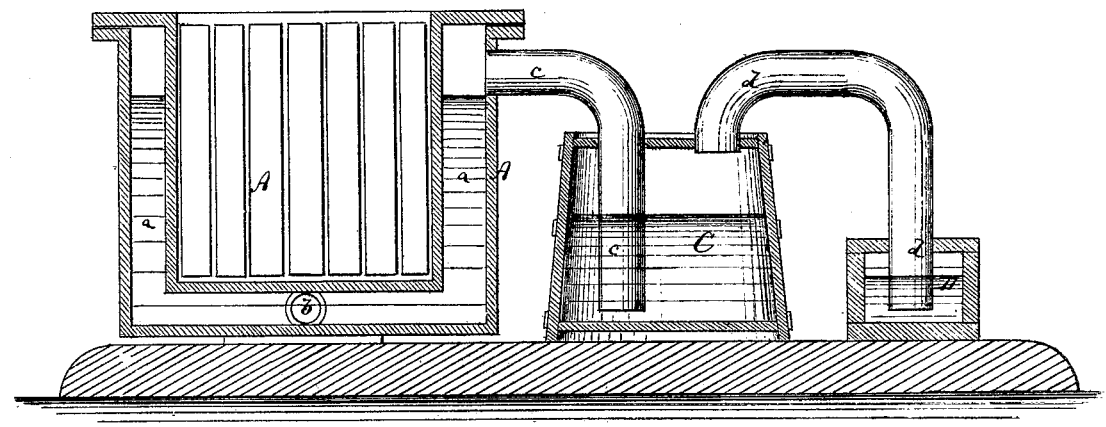
Figure 3:
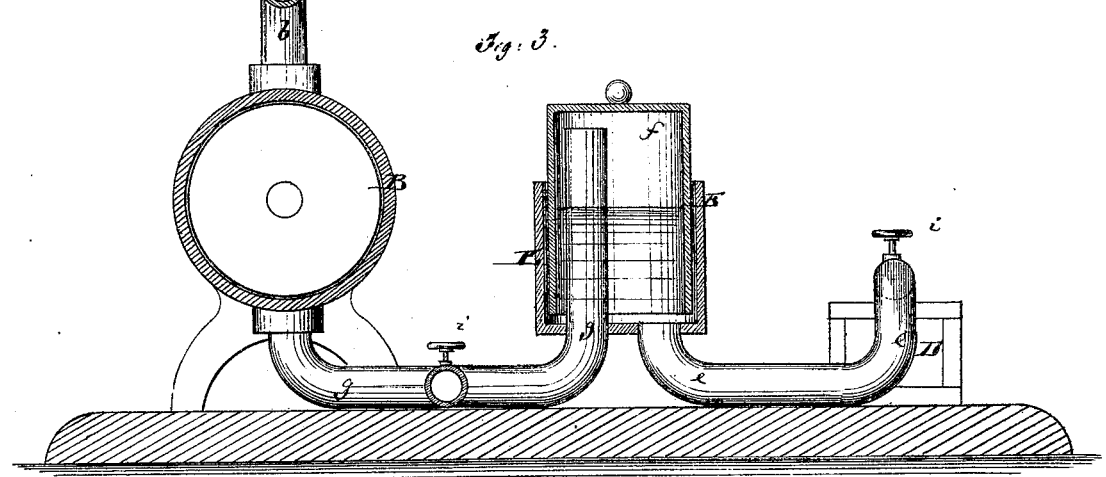
Figure 4:
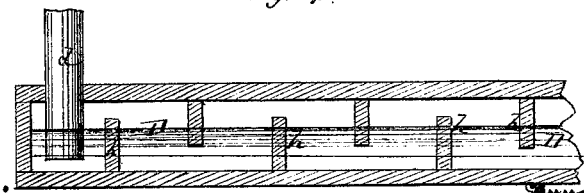

Figure 1 is a plan view of an ice-machine; Fig. 2, a vertical and transverse section thereof on line $x\ x$; and Fig. 3, a similar section on line $y\ y$ of Fig. 1. Fig. 4 is a longitudinal section in line $z\ z$ of Fig. 1.

A represents the tank; $a$, the chamber in which the freezing material is placed; and A', the water-chamber. B represents an air-pump; $b$, the pipe that connects it with the freezing-chamber $a$; and $c$, the pipe through which the air escapes from said chamber. C is a separate vessel, which is filled with oil or other hydrocarbon, and through which the pipe $c$ passes down into the oil. D is a second oil-vessel connected with the first by a pipe, $d$. E E are two vessels having weighted covers $f\ f$, and each connected with vessel D by a pipe, $e$. These pipes E are also connected with pump B by a pipe, $g$.

The freezing substance which we preferably employ is bisulphide of carbon, although ether, rhigoline, or chloroform may be employed in the same way, if not to the same advantage, all being equally well known for this purpose.

The air is forced from pump B into the pipe $b$, whence it passes into the freezing-chamber $a$. It then passes through the bisulphide of carbon, becomes surcharged therewith, and abstracts the required addition of latent heat from the water-chamber. This heat and vapor of the bisulphide is then carried with the air, through pipes $c\ d$, into the oil of chambers C D, where they are eliminated; and the air, purified, is carried into chamber E, from whence it is returned to the pump B through pipe $g$ by closing the cock of inlet-pipe $e$ and weighting the cover $f$. The oil, when it has absorbed as large a quantum of heat and of the bisulphide as is expedient, is drawn off, distilled, and the bisulphuret of carbon reobtained in its original quantity and purity.

The process of evaporating a substance placed in juxtaposition to the vessel of water to be formed into ice is, of course, old; but it has been hitherto practically impossible to properly utilize sulphide of carbon and kindred substances for this purpose on account of several practical difficulties. First, the loss of the freezing substance in the operation has prevented the posibility of economically making the ice in other than exceptional localities. Under the patent granted to Tuttle and Lugo the air that becomes charged with heat and vapor abstracted from the freezing liquid is reconveyed into the air-pump, and there denuded to some extent of its bisulphide of carbon by compression and condensation. This, however, leaves a very large percentage of freezing material which the returning air is compelled to bear back in the condition of vapor to the freezing liquid. The air is the carrier whose business it is to load itself with vaporized particles of the volatile liquid and carry them off with the latent heat which they have absorbed. Now, if this carrier is compelled to go back with a large portion of its load, its usefulness is practically destroyed.

We overcome this difficulty by passing our loaded air through oil, which unloads it entirely or nearly so. The air is thus kept pure and in its full power of action by being completely unloaded before it is carried back into the freezing liquid, and by the simple process of distillation we recover nearly all the bisulphide of carbon.

Another improvement which we have made in the old process of evaporating a volatile liquid by a current of air consists in eliminating the aqueous vapor, which is always carried by it in greater or less quantities, and which forms frost and ice in the pipes. This we accomplish by passing the current of air over chloride of calcium located in the bottom of the air-pipe $b$. The affinity of these substances for the watery particles causes them to remove the aqueous vapor entirely from the air before it enters the chamber of the freezing liquid.

Another difficulty which relates to the bisulphide is its tendency to a too rapid evaporation, and the consequent danger to the machine and building.

We overcome this by introducing a concentrated solution of chloride of sodium into the freezing-chamber, which floats upon the bisulphide and prevents its contact with any air except that which is being forced therethrough.

We are aware that a current of air has been passed through a volatile liquid or freezing mixture, and also that it has been attempted to utilize the same air in a double-acting air-pump; but we believe that no suitable way has been yet devised of ridding the air of the vapor with which it has become loaded, and of transferring the said vapor to a place from which it can be obtained for subsequent use. By passing the vapor-charged air through a liquid absorbent which will strip it of its vapor we can at once use the air; and, by arresting the vapor in the oil, it can readily be eliminated therefrom and again used.

Having thus described all that is necessary to a full understanding of our invention, what we esteem to be new, and desire to protect by Letters Patent, is—

1. In ice making by a current of air passed through a volatile liquid, the method of eliminating the adhering vapor of the bisulphide of carbon from the air by passing it through oil, as described.

2. The method of regulating, in ice-machines, the evaporation of the bisulphide of carbon by a concentrated solution of chloride of sodium floating thereon, as described.

3. The method of eliminating in ice-machines, the aqueous vapor in the current of air being used by passing it over chloride of calcium before it enters the freezing-chamber, as described.

WILLIAM R. JOHNSTON.
WILLIAM WHITELAW.

Witnesess:
  W. D. SAGENFRITZ,
  A. B. THOMAS,
  A. G. GOODLETT,
  JAMES ROSE.